United States Patent
Karbula et al.

(10) Patent No.: US 7,792,646 B2
(45) Date of Patent: Sep. 7, 2010

(54) MEASURING ARRANGEMENT FOR REGISTERING CHEMICAL AND/OR PHYSICAL, MEASURED VARIABLES, AS WELL AS MEASURING DEVICE THEREFOR

(75) Inventors: Jiri Karbula, Riehen (CH); Robert Lalla, Lörrach (DE); Gernot Engstler, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 160 days.

(21) Appl. No.: 11/987,041

(22) Filed: Nov. 27, 2007

(65) Prior Publication Data

US 2008/0147336 A1   Jun. 19, 2008

Related U.S. Application Data

(60) Provisional application No. 60/861,246, filed on Nov. 28, 2006, provisional application No. 60/873,005, filed on Dec. 6, 2006.

(51) Int. Cl.
*G01N 31/00* (2006.01)
*G01R 25/00* (2006.01)
(52) U.S. Cl. .............. 702/30; 361/18; 702/65
(58) Field of Classification Search ........... 702/57, 702/64, 65; 73/861.01, 861.02, 861.03; 307/97; 340/820.11; 361/18; 713/300
See application file for complete search history.

(56) References Cited

U.S. PATENT DOCUMENTS

| 6,608,566 | B1 | 8/2003 | Davis |
| 6,684,340 | B1 | 1/2004 | Lubcke |
| 2006/0161359 | A1 | 7/2006 | Lalla |
| 2008/0013226 | A1* | 1/2008 | Kirst ............... 361/18 |

FOREIGN PATENT DOCUMENTS

| DE | 100 20 941 A1 | 1/2001 |
| EP | 0 415 760 A2 | 3/1991 |
| EP | 0 866 316 B1 | 9/1998 |

* cited by examiner

*Primary Examiner*—John H Le
(74) *Attorney, Agent, or Firm*—Bacon & Thomas, PLLC

(57) ABSTRACT

A measuring arrangement of the invention includes: At least one measuring device, which generates, repeatedly during operation, measured values, especially digital, measured values, representing the at least one measured variable to be registered; as well as an electronic data processing system superordinated to the at least one measuring device, especially a data processing system which is spatially distributed and/or spatially remote from the measuring device. Measuring device and data processing system are connected together by means of at least two line-pairs, through each of which an electrical current flows, at least at times, during operation. According to the invention, the measuring device transmits the internally generated, measured values to the data processing system via both line-pairs. In this way, it is then possible to transmit a plurality of measured values simultaneously, when each of the two line-pairs is embodied as part of a two-conductor current-loop.

21 Claims, 2 Drawing Sheets

MEASURING ARRANGEMENT FOR REGISTERING CHEMICAL AND/OR PHYSICAL, MEASURED VARIABLES, AS WELL AS MEASURING DEVICE THEREFOR

CROSS-REFERENCES

This application is a nonprovisional of U.S. Provisional Application 60/861,246 filed on Nov. 28, 2006 and U.S. Provisional Application 60/873,005 filed on Dec. 6, 2006 and which claims the benefit of German application numbers 102006056175.9 filed on Nov. 27, 2006.

FIELD OF THE INVENTION

The invention relates to a measuring arrangement for registering chemical and/or physical, measured variables, especially of flowable fluid media and/or flowable solid media, which measuring arrangement includes: At least one measuring device, which repeatedly generates during operation, by means of an internal measuring device electronics, measured values, especially digital, measured values, representing the at least one measured variable to be registered; as well as an electronic data processing system superordinated to the at least one measuring device, especially an electronic data processing system which is spatially distributed and/or spatially remote from the measuring device. Moreover, the invention relates to a measuring device (especially a measuring device suited for implementing the aforementioned measuring arrangement) including: A measuring transducer reacting to changes of the at least one physical or chemical, measured variable and delivering at least one measurement signal influenced by the at least one measured variable; and a measuring device electronics connected to the measuring transducer.

In industrial process measurement technology, especially also in connection with the automation of chemical or fabrication processes and/or in connection with automatic control of industrial plants, measuring devices installed near to the process, so-called "field devices", are used, which serve to produce measured values, and measured value signals, which, in the final analysis, carry the measured values, providing analog or digital representation of process variables. The process variables can be, for example, mass flow rate, a density, viscosity, fill- or limit-level, a pressure, or a temperature, or the like, of a liquid, powdered, vaporous or gaseous medium conveyed, or held, as the case may be, in a corresponding containment, such as e.g. a pipeline or a tank. For the registering of the respective process variables, field devices of the aforementioned kind include, as the case may be, a corresponding physical-to-electrical, or chemical-to-electrical, measuring transducer. This is, most often, installed in a wall of the container containing the medium, or in the course of a line, for example a pipeline, conveying the medium, as the case may be, and serves for producing at least one electrical, measurement signal appropriately corresponding to the process variable to be registered. For the processing of the measurement signals, the measuring transducer is additionally connected to an operating and evaluating circuit internal in the measuring device, provided in the measuring device electronics and serving for the further processing or evaluation of the at least one measurement signal, as well as also for generating corresponding measured value signals.

BACKGROUND OF THE INVENTION

In the case of a large number of field devices of the described kind, the measuring transducer is so activated during operation, for production of the measurement signal, additionally by an activating signal generated at least at times by the operating and evaluating circuit that it acts on the medium in a manner suited for the measurement, at least directly, or, however, practically directly via a probe directly contacting the medium, in order to evoke there reactions appropriately corresponding to the measured variable to be registered. The activating signal can, in such case, be appropriately controlled, for example with respect to an electrical current strength, a voltage level and/or a frequency. Examples of such active measuring transducers, thus measuring transducers appropriately converting an electrical activating signal in the medium include, especially, flow measuring transducers serving for measuring media flowing at least at times, and having e.g. at least one coil producing a magnetic field activated by the activating signal or at least one ultrasonic transmitter activated by the activating signal, or fill and/or limit level transducers serving for measuring and/or monitoring fill level in a container, such as e.g. those with a freely radiating, microwave antenna, Goubau-line or vibrating immersion element.

For accommodating the measuring device electronics, field devices of the described kind further include a comparatively robust, especially impact-, pressure- and/or weather-resistant, electronics housing. This can, as proposed e.g. in U.S. Pat. No. 6,397,683 or WO-A 00/36379, be arranged remotely from the field device and be connected therewith only via a flexible cable; it can, however, also be, as disclosed in EP-A 903 651 or EP-A 1 008 836, one arranged directly on the measuring transducer or on a measuring transducer housing separately housing the measuring transducer. Often then the electronics housing serves, as shown, for example, in EP-A 984 248, U.S. Pat. Nos. 4,594,584, 4,716,770 or 6,352,000, also for accommodating, as well, various mechanical components of the measuring transducer, components such as e.g. membrane-, rod- or tube-shaped, deformation- or vibration-elements operationally deforming as a result of mechanical effects; compare, in this connection, also the initially mentioned U.S. Pat. No. 6,352,000.

In the case of measuring devices of the aforementioned kind, the respective measuring device electronics are usually electrically connected via corresponding electrical lines to a superordinated, electronic, data processing system, which is, most often, arranged spatially remotely and also spatially distributedly and to which the measured value produced by the measuring devices is transmitted, essentially in real-time, by means of a measured value signal appropriately bearing such measured value.

Measuring devices of the described kind are, additionally, usually connected together and/or with appropriate, electronic process control units by means of a data transmission network provided as a part of the superordinated data processing system. The data processing system can involve, for example, one or more programmable logic controllers installed on-site, or process control computers installed in a remote control room, to which the measured values produced by means of the measuring device, digitized in suitable manner and appropriately coded, are sent. By means of such process control computers, the transmitted measured values can be further processed and visualized as corresponding measured results e.g. on monitors and/or converted into control signals for other field devices embodied as control devices, e.g. magnetic valves, electric motors, etc. Since modern measuring arrangements can mostly also be monitored, and, as required, controlled and/or configured, by such control computers, operating data pertinent to the measurement transmitter feeding device and/or to the measuring device are equally transmitted in appropriate manner via the aforementioned data transmission networks, which are, most often, hybrid as regards transmission physics and/or transmission logic. Accordingly, the data processing system serves usually also for conditioning the measured value signal delivered from the measuring device. The conditioning is done according to the requirements of the subsequently placed data transmission networks and includes, for example, suitable digitizing and, as required, conversion into appropriate telegrams, and/or evaluation on site. For this propose, included in such data processing systems are evaluating circuits electrically coupled with the respective connecting lines. These evaluating circuits pre- or further-process, as well as, where necessary, suitably convert, the measured values received from the respective measuring device. Serving for the data transmission in such industrial data processing systems, at least sectionally, especially serially, are fieldbusses, such as e.g. FOUNDATION FIELDBUS, RACKBUS-RS 485, PROFIBUS, etc., or, for example, also networks based on the ETHERNET standard, as well as the corresponding, usually comprehensively standardized, transmission protocols.

Besides the evaluation circuits required for the processing and converting of the measured values delivered by the respectively connected measuring devices, such superordinated data transmission systems most often also include, for supply of the connected measuring devices with electrical energy, electrical supply circuits, which make available for the respective measuring device electronics an appropriate supply voltage, especially a supply voltage fed directly from the connected fieldbus, for driving electrical currents flowing through the electrical lines connected thereto as well as the respective measuring device electronics. A supply circuit can, in such case, be accommodated (for example, as assigned exactly to one measuring device and joined together with the evaluating circuit assigned to the particular measuring device—for example for a corresponding fieldbus adapter) in a common electronics housing, e.g. one embodied as a top-hat module. It is, however, also quite usual to place supply circuits and evaluating circuits in separate electronics housings, perhaps spatially removed from one another, and to appropriately connect them together via external lines.

Examples providing further information for such measuring devices known per se to those skilled in the art or for such measuring arrangements, such as are embodied in an interaction of measuring device and a corresponding data processing system are described extensively and in detail in, among others, WO-A 03/048874, WO-A 02/45045, WO-A 02/103327, WO-A 02/086426, WO-A 01/02816, WO-A 00/48157, WO-A 00/36379, WO-A 00/14485, WO-A 95/16897, WO-A 88/02853, WO-A 88/02476, U.S. Pat. Nos. 7,134,348, 7,133,727, 7,075,313, 7,073,396, 7,032,045, 6,854,055, 6,799,476, 6,776,053, 6,769,301, 6,577,989, 6,662,120, 6,640,308, 6,574,515, 6,535,161, 6,512,358, 6,487,507, 6,480,131, 6,476,522, 6,397,683, 6,352,000, 6,311,136, 6,285,094, 6,269,701, 6,236,322, 6,140,940, 6,014,100, 6,006,609, 5,959,372, 5,796,011, 5,742,225, 5,706,007, 5,687,100, 5,672,975, 5,604,685, 5,535,243, 5,469,748, 5,416,723, 5,363,341, 5,359,881, 5,231,884, 5,207,101, 5,131,279, 5,068,592, 5,065,152, 5,052,230, 4,926,340, 4,850,213, 4,768,384, 4,716,770, 4,656,353, 4,617,607, 4,594,584, 4,574,328, 4,524,610, 4,468,971, 4,317,116, 4,308,754, 3,878,725, US-A 2006/0179956, US-A 2006/0161359, US-A 2006/0112774, US-A 2006/0096390, US-A 2005/0139015, US-A 2004/0117675, EP-A 1 158 289, EP-A 1 147 463, EP-A 1 058 093, EP-A 984 248, EP-A 591 926, EP-A 525 920, DE-A 44 12 388 or DE-A 39 34 007.

In the case of modern measuring devices of the type being discussed, often involved are so-called two-conductor field devices, thus such measuring devices, in the case of which the measuring device electronics is electrically connected with the superordinated data processing system solely via a single pair of lines and in the case of which both the electrical energy fed from outside into the measuring device as well as also the measured values produced by the measuring device are transmitted via the single pair of electrical lines. Often, in the case of two-conductor field devices, the current driven by the external supply voltage and flowing during operation in the current loop formed by means of the pair of lines and correspondingly tuned on the measuring device side by means of load modulation, serves as the signal carrier bearing the measured values. In numerous industrial applications, it is established practice, in such case, to embody the one-pair connecting line as a so-called 4 mA to 20 mA current loop. In such case, the instantaneous measured value is, as is known, represented analogy by means of an instantaneously tuned, electrical current strength, which lies within a predetermined range between 4 mA and 20 mA (=milliamperes). The measuring device electronics includes, for such purpose, usually, in each case, a current controller, through which the loop current flows and which serves for setting or modulating, and, as required, also clocking, or switching, of the current, an internal operating and evaluating circuit for operating the measuring device, as well as an internal supply circuit lying at an internal input voltage of the measuring device electronics, divided from the supply voltage and feeding the internal operating and evaluating circuit and having at least one voltage controller, through which a variable component of the loop current flows. The voltage controller provides in the measuring device electronics an internal, useful-voltage controlled to be essentially constant at a predeterminable voltage level. Examples of such two-conductor field devices are disclosed in, among others, WO-A 03/048874, WO-A 02/45045, WO-A 02/103327, WO-A 00/48157, WO-A 00/26739, WO-A 94/20940, U.S. Pat. Nos. 6,799,476, 6,577,989, 6,662, 120, 6,574,515, 6,535,161, 6,512,358, 6,480,131, 6,311,136, 6,285,094, 6,269,701, 6,140,940, 6,014,100, 5,959,372, 5,742,225, 5,672,975, 5,535,243, 5,416,723, 5,207,101, 5,068,592, 5,065,152, 4,926,340, 4,656,353, 4,317,116, US-A2006/0161359, US-A 2004/0117675, EP-A 1 147 841, EP-A 1 058 093, EP-A 591 926, EP-A 525 920, DE-A 44 12 388, or DE-A 39 34 007.

A special problem of such two-conductor field-devices is, however, that essentially only a single, physical, information carrier—here the electrical current, respectively its level, flowing in the line-pair—is provided for the measured values to be transmitted and that, as a result, instantaneously always only exactly a single measured value of the particular measuring device can be evaluated in the superordinated evaluating unit connected via the line-pair. In other words, in the case of such two-conductor field devices, multiple measured values—be they of the same and/or different type—are transmitted in all cases sequentially in real time. For the case, however, arising quite often, wherein the field device is a multivariable measuring device, for example a Coriolis mass flow/density meter, which is capable of ascertaining highly accurately and quasi in parallel, with high update rates, measured values of various kinds, for example the instantaneous and/or time-integrated mass flow, the instantaneous density and/or an instantaneous viscosity of the medium, the potential of this measuring device would not be able to be utilized in full measure, as a result being limited by the conventional, actually otherwise very advantageous, two-conductor technology.

A further problem of such measuring devices implemented in two-conductor technology is, additionally, that the electrical power actually usable by the measuring device electronics—for short, the "available power"—can fluctuate during operation over a wide range in practically unpredictable manner, as a result of changes of the measured variable as a function of time. As a result of this, only the power "available" at minimum nominal current, e.g. about 4 mA, can be safely depended on as the nominal power.

Making the situation more difficult is the fact that a large number of modern field devices of the described kind must, additionally, be so embodied electrically that they meet requirements for explosion safety. Especially, such field devices are operated, in the case of required intrinsic explosion safety, with such a low electrical "available" power, that, in order not to bring about ignition conditions, sparks or arcs cannot be issued electrically, with also the electrical energy stored in all possible cases directly in the measuring device having to be taken into consideration in the total energy and power balance. As a result of this, also the storage of momentarily excess electrical energy is only possible to a very limited, most often only insufficient, degree. Intrinsically safe explosion protection is given, for example according to the European standards EN 50 014 and EN 50 020, when electronic devices are so constructed that they satisfy the ignition protection type "Intrinsic Safety (Ex-i)" defined therein. In accordance with this ignition protection type, thus, electrical currents, voltages and powers arising in the field device must at all times not exceed specified current, voltage and power, limit values. These three limit values are so chosen that, in the case of malfunction, for example in the case of short circuiting in the measuring device electronics, the maximally liberated amount of energy is not sufficient to produce an ignition-capable spark. Usually, in the case of intrinsically safe field devices, the electrical power is not permitted to exceed 1 W (=watt) of electrical power. The voltage can be kept below the specified limit values e.g. by Z-diodes, the current e.g. by resistors and/or fuses, and the power by appropriate combinations of voltage and current limiting components and/or appropriate power controllers. In certain circumstances, it is also possible to provide in the individual measuring device electronics, as described e.g. in U.S. Pat. No. 7,113,375, corresponding safety circuits, which enable, additionally, an automatic shut-down at least of malfunctioning and/or malfunction-causing components, or assemblies, of the measuring device electronics.

In order to cope with the time-dependent lack of available power, modern two-conductor measuring devices, especially those with (4 mA to 20 mA) current loops, are consequently, in part, so designed, that their device functionality, implemented by means of a microcomputer provided in the evaluating and operating circuit, is variable, and, as a result, the operating and evaluating circuit, which mostly uses little power anyway, can be adapted to the momentarily available power. In certain cases, also individual circuit components of the particular measuring device electronics can be shifted during operation into a standby mode requiring less power or, as required, even be completely turned off for a time.

Further solutions for implementation of measurement arrangements wherein, on the one hand, the measuring device, which may be embodied with intrinsic safety, can be supplied permanently with electrical power and, on the other hand, can be connected to the two-conductor interface formed in the interaction of supply and evaluating circuits within the superordinated data processing system, are proposed, for example, in U.S. Pat. No. 6,684,340 or U.S. Pat. No. 6,472,884. Accordingly, the measuring device is fed with electrical energy by appropriate, external supply circuits, in each case, via two line-pairs formed, in each case, as two-conductor current loops, wherein the variable currents flowing, in each case, in the line-pairs, are controlled largely independently by the particular measuring device. Further, it is provided in the proposed measuring arrangements that the instantaneous current strength of one of the currents is set as a function of the measured value, while the instantaneous current strength of the other current is set essentially as a function of the instantaneous energy requirement of the measuring device.

SUMMARY OF THE INVENTION

Starting from the above-discussed disadvantages of such measuring arrangements formed by means of conventional, most often intrinsically safe, two-conductor measuring devices and correspondingly superordinated, data processing systems, an object of the invention is to improve measuring arrangements of the type being discussed here, on the one hand, such that the measuring devices used therein are capable of simultaneously issuing more than one measured value, especially also a plurality of measured values of different kind and of transmitting them to the superordinated data processing system. On the other hand, it should be possible to embody the measuring device, in case required, however also after as well as before, explosion-safely in sufficient degree, especially intrinsically safely. Moreover, the measuring device, as well as also the measuring arrangement finally embodied on the basis thereof, should be so constructed that they can be incorporated as simply as possible into existing industrial plants and data processing systems, and, indeed, while maintaining, as much as possible, design and infrastructure of conventional industrial data transmission networks, especially also already existing fieldbus systems. Additionally, in such case, also the already installed base, as regards the data processing system, especially in operationally proven, two-conductor technology, should continue to be useable as much as possible, particularly without extensive alternations within the existing data processing system or change of the already installed data transmission network.

For achieving this object, the invention provides in a measuring arrangement for measuring chemical and/or physical, measured variables, especially of flowable fluid media and/or flowable solid media, which measuring arrangement includes: At least one measuring device, which repeatedly generates during operation, by means of an internal measuring device electronics, measured values, especially digital, measured values, representing the at least one measured variable to be registered; as well as an electronic data processing system superordinated to the at least one measuring device, especially an electronic data processing system which is spatially distributed and/or spatially remote from the measuring device; wherein, in the measuring arrangement of the invention, measuring device and data processing system are connected together by means of at least a first pair of lines, or, for short, line-pair, through which, during operation, at least at times, a first current flows, and by means of at least a second pair of lines, or line-pair, through which, during operation, at least at times, a second current flows. Further, in the case of the measuring arrangement of the invention, it is provided that the measuring device transmits the internally generated measured values to the data processing system, at least in part, via the first line-pair and at least in part via the second line-pair.

Additionally, the invention resides in a measuring device, especially a measuring device suited for putting the aforementioned measuring arrangement into practice, including: A measuring transducer reacting to changes of at least one physical or chemical, measured variable and delivering at least one measurement signal influenced by the at least one measured variable; and a measuring device electronics connected to the measuring transducer. In the case of the measuring device of the invention, it is further provided that the measuring device electronics is connectable to a superordinated, electronic data processing system, especially a spatially distributed data processing system and/or one spatially remote from the measuring device, for operation by means of at least a first line-pair and by means of at least a second line-pair. Additionally, the measuring device electronics is designed for generating during operation a plurality of measured values, especially digital measured values, representing, at least proportionally, the at least one measured variable, and for transmitting these, at least in part, via the first line-pair and, at least in part, via the second line-pair, to the connected data processing system.

In a first embodiment of the measuring arrangement of the invention, it is provided that the measuring device transmits internally generated, measured values to the data processing system by adjusting an electrical current strength of the current flowing, at least at times, through the first line-pair. Taking this further, in this embodiment of the invention, it is provided that the measuring device varies the current flowing in the first line-pair within a predetermined current level range, especially within a current level range between 4 mA and 20 mA. In another, further development of the invention, it is provided that the measuring device transmits internally generated, measured values to the data processing system by clocking, or switching, the current flowing in the first line-pair, for example by varying a clock, or switching, frequency and/or a pulse width of the current flowing in the first line-pair.

In a second embodiment of the measuring arrangement of the invention, it is provided that the measuring device transmits internally generated, measured values to the data processing system by adjusting an electrical current strength of the current flowing, at least at times, through the second line-pair. Taking this further, in this embodiment of the invention, it is provided that the measuring device varies the current flowing in the second line-pair within a predetermined current level range, especially within a current level range between 4 mA and 20 mA. In another further development of the invention, it is provided that the measuring device transmits internally generated, measured values to the data processing system by clocking, or switching, the current flowing in the second line-pair, for example by varying a clock, or switching, frequency and/or a pulse width of the current flowing in the second line-pair.

In a third embodiment of the measuring arrangement of the invention, it is provided that the data processing system provides at least one supply voltage, which drives at least the current flowing through the first line-pair. Developing the invention further, it is provided, in the case of this embodiment, additionally, that the at least one supply voltage drives both the current flowing through the first line-pair as well as also the current flowing through the second line-pair.

In a fourth embodiment of the measuring arrangement of the invention, it is provided that the data processing system provides at least a first supply voltage, which, at least at times, drives the first current flowing through the first line-pair, and that the data processing system provides at least a second supply voltage, which drives, at least at times, the second current flowing through the second line-pair.

In a fifth embodiment of the measuring arrangement of the invention, it is provided that at least the first current serves, at least in part, especially entirely, also for supply of the measuring device with electrical energy.

In a sixth embodiment of the measuring arrangement of the invention, it is provided that each of the two currents serves, at least at times and/or at least in part, also for supply of the measuring device with electrical energy.

In a seventh embodiment of the measuring arrangement of the invention, it is provided that the measuring device covers its instantaneous energy requirement at least in part by means of the second current.

In an eighth embodiment of the measuring arrangement of the invention, it is provided that the measuring device covers its instantaneous energy requirement at least in part by means of the first current and at least in part by means of the second current.

In a ninth embodiment of the measuring arrangement of the invention, it is provided that the measuring device covers its instantaneous energy requirement completely by means of the first and second currents.

In a tenth embodiment of the measuring arrangement of the invention, it is provided that voltage limiters are provided in the first and/or second line-pair(s), especially at an input of the measuring device electronics, and limit an electrical excess voltage, or overvoltage, possibly applied to the input of the measuring device electronics to an allowable, maximum value.

In an eleventh embodiment of the measuring arrangement of the invention, it is provided that electrical current limiters are provided in the first and/or second line-pair(s), especially at the input of the measuring device electronics, and limit a short-circuit current possibly flowing in a line-pair to an allowable, maximum value.

In a twelfth embodiment of the measuring arrangement of the invention, it is provided that the first line-pair is, at least within the measuring device electronics, galvanically separated and/or spatial separated, especially separated by partition or encapsulation, from the second line-pair.

In a thirteenth embodiment of the measuring arrangement of the invention, such further includes at least one measuring transducer which reacts to changes of at least of the at least one measured variable to be registered and which delivers to the measuring device electronics at least one measurement signal corresponding at least with this measured variable. Developing this further, it is provided that the measuring device electronics of the measuring device produces the measured values at least partially by taking into consideration the at least one measurement signal.

In a fourteenth embodiment of the measuring arrangement of the invention, such further includes at least one measuring transducer which reacts to changes of a measured variable of a first kind to be registered, for example a mass flow, e.g. a mass flow rate, of a medium flowing in a connected pipeline, and at least one measured variable of a second kind to be registered, for example a density or a viscosity of a medium flowing in a connected pipeline, and which delivers at least one measurement signal corresponding with the measured variable of the first kind. Developing the invention further, it is further provided that the at least one measurement signal delivered by the measuring transducer represents also the measured variable of the second kind. Alternatively or in supplementation thereto, it is provided that the measuring transducer delivers at least first and second measurement signals. Additionally, it is provided that the measuring device electronics produces the measured values at least in part by taking into consideration the first and second measurement signals.

In a fifteenth embodiment of the measuring arrangement of the invention, such further includes an electronics housing which houses the measuring device electronics.

In a sixteenth embodiment of the measuring arrangement of the invention, such further includes a measuring transducer housing at least partially housing the measuring transducer.

In a seventeenth embodiment of the measuring arrangement of the invention, such further includes an electronics housing housing the measuring device electronics as well as a measuring transducer housing at least partially housing the measuring transducer, with the measuring transducer housing and electronics housing being connected mechanically, especially essentially rigidly, together.

In an eighteenth embodiment of the measuring arrangement of the invention, it is provided that the measuring device and data processing system are further connected together by means of at least a third line-pair, through which a third current flows, at least at times, during operation. In a further development of this embodiment of the invention, it is additionally provided that the measuring device transmits the internally generated, measured values to the data processing system at least partially also via the third line-pair.

In a nineteenth embodiment of the measuring arrangement of the invention, it is provided that the data processing system further includes at least one evaluating circuit communicating with at least one of the line-pairs for registering measured values transmitted from the measuring device.

In a twentieth embodiment of the measuring arrangement of the invention, it is provided that the data processing system further includes at least one fieldbus, especially a serial fieldbus, serving for transmission of digital, measured values.

In a twenty-first embodiment of the measuring arrangement of the invention, the data processing system further includes at least one evaluating circuit communicating with at least one of the line-pairs for registering measured values transmitted from the measuring device, as well as at least one fieldbus, especially a serial fieldbus, serving for transmission of digital measured values, with the at least one evaluating circuit being coupled to the at least one fieldbus.

In a twenty-second embodiment of the measuring arrangement of the invention, it is provided that the data processing system further includes at least a first measuring resistor, through which the first current flows, at least at times.

In a twenty-third embodiment of the measuring arrangement of the invention, it is provided that the data processing system further includes at least one evaluating circuit for registering measured values transmitted from the measuring device and registering, at least at times, a measurement voltage essentially falling across the first measuring resistor and corresponding with the first current. Developing this embodiment of the invention further, it is additionally provided that the data processing system further includes at least a second measuring resistor, through which the second current flows, at least at times. Furthermore, it is provided that the data processing system additionally includes at least one evaluating circuit for registering measured values transmitted by the measuring device and registering, at least at times, a measurement voltage dropping across the second measuring resistor and corresponding with the second current.

In a twenty-fourth embodiment of the measuring arrangement of the invention, it is provided that the data processing system further includes a first evaluating circuit portion communicating with the first line-pair for registering measured valued transmitted via the first line-pair, as well as a second evaluating circuit portion communicating with the second line-pair for registering measured values transmitted via the second line-pair. Developing this embodiment of the invention further, it is additionally provided that the first evaluating circuit component registers, at least at times, a measurement voltage dropping essentially over a measuring resistor, through which the first current flows, and/or that the second evaluating circuit component registers, at least at times, a measurement voltage dropping essentially across a measuring resistor, through which the second current flows.

In a first embodiment of the measuring device of the invention, it is provided that a first current, driven by the data processing system, flows during operation, at least at times, through the measuring device electronics and the first line-pair.

In a second embodiment of the measuring device of the invention, it is provided that a second current, especially a second current driven by the data processing system, flows during operation, at least at times, through the measuring device electronics and the second line-pair.

In a third embodiment of the measuring device of the invention, it is provided that at least the first current serves, at least in part, especially entirely, also for supplying the measuring device with electrical energy.

In a fourth embodiment of the measuring device of the invention, it is provided that each of the two currents serves, at least at times and/or at least in part, also for supplying the measuring device with electrical energy.

In a fifth embodiment of the invention, it is provided that the measuring device covers, during operation, its energy requirement, at least in part, by means of the first current.

In a sixth embodiment of the measuring device of the invention, it is provided that the measuring device covers, during measuring operation, its energy requirement, at least in part, by means of the first current and at least in part by means of the second current.

In a seventh embodiment of the measuring device of the invention, it is provided that the measuring device covers, during operation, its energy requirement, at least at times, entirely by means of the first current and/or by means of the second current.

In an eighth embodiment of the measuring device of the invention, it is provided that, within the measuring device electronics, voltage limiters are placed in the first and/or second line-pair(s) for limiting, to a permissible, maximum value, an electrical overvoltage possibly present in the measuring device electronics, especially at its input.

In a ninth embodiment of the measuring device of the invention, it is provided that, within the measuring device electronics, current limiters are placed in the first and/or second line-pair(s) for limiting a short-circuit current possibly flowing in an involved line-pair to a permissible maximum value.

In a tenth embodiment of the measuring device of the invention, it is provided that the first line-pair is galvanically separated and/or spatially separated, especially partitioned or encapsulated, from the second line-pair, at least within the measuring device electronics.

In an eleventh embodiment of the measuring device of the invention, it is provided that at least one transformer is provided in the measuring device electronics for galvanic separation of the two line-pairs.

In a twelfth embodiment of the measuring device of the invention, it is provided that at least one optocoupler is provided in the measuring device electronics for galvanic separation of the two line-pairs.

In a thirteenth embodiment of the measuring device of the invention, it is provided that the measuring device electronics includes a first voltage converter connected on the primary-side to the first line-pair and a second voltage converter connected on the primary side to the second line-pair. Developing this embodiment of the invention further, it is additionally provided that the two voltage converters are electrically coupled, especially galvanically connected, together on the secondary side. In another, further development of this embodiment, it is provided that the two voltage converters are switched with essentially the same frequency during operation. Further, it can, in this case, be of advantage, when the two voltage converters are switched during operation out of phase, especially with opposite phase. Alternatively thereto, the two voltage converters can, as required, also be switched asynchronously during operation.

In a fourteenth embodiment of the measuring device of the invention, it is provided that the measuring device electronics of the measuring device produces the measured values, at least in part, taking into consideration the at least one measurement signal.

In a fifteenth embodiment of the measuring device of the invention, it is provided that the measuring transducer reacts to changes of a measured variable of a first kind to be registered and also to at least a measured variable of a second kind to be registered. Developing this embodiment further, it is additionally provided that the at least one measurement signal delivered by the measuring transducer represents both the measured variable of the first kind and also the measured variable of the second kind. Alternatively or in supplementation thereto, in another further development of the invention, the measuring transducer delivers at least first and second measurement signals. Furthermore, it is provided, in such case, that the measuring device electronics produces the measured values, at least partially, by taking into consideration the first and second measurement signals.

In a sixteenth embodiment of the measuring device of the invention, it is provided that the measuring device further includes an electronics housing, which houses the measuring device electronics. In a further development of this embodiment of the invention, the measuring device further includes a measuring transducer housing at least partially housing the measuring transducer, and the measuring transducer housing and the electronics housing are mechanically, especially rigidly, connected together.

A basic idea of the invention is to make measuring devices of the described kind, on the one hand, able to issue by line-pair a plurality of measured values, especially also measured values of different type, simultaneously and largely independently of one another, as well as able to transmit them independently of one another to the superordinated data processing system. On the other hand, the measuring device should, in case required, also be embodied before as well as after to be explosion-safe, especially intrinsically safe, to a sufficient degree and/or be able to be operated as regards the superordinated data processing system by means of appropriate supply and evaluating circuits in conventional two conductor technology.

An advantage of the invention is that the measuring device and the measuring arrangement formed therewith can be so designed that they can, in principle, be incorporated very easily also into already existing infrastructure of conventional, industrial, data transmission networks, especially already existing fieldbus systems, and thus can be integrated, without more, into existing industrial plants and conventional data processing systems. In such case, also the architectures implemented and established in such plants as regards data transmission and processing can be kept largely unchanged.

Additionally, the measuring device can, in such case, especially in the case of application of two, conventional, two-conductor current loops as line-pairs, be so embodied that it can be connected via each of the at least two line-pairs to conventional fieldbus adapters or the like and, as a result, can be connected practically directly to conventional fieldbusses, such as e.g. FOUNDATION FIELDBUS.

As a result of the fact that, in such case, the already installed base as regards the data processing systems, especially in operationally proven, two-conductor technology, remains largely usable, it is possible, at least for the quite usual case in which already-installed, free connection places for two-conductor measuring devices are present in sufficient degree, to place the measuring arrangement practically immediately and directly into operation. In other cases, however, even a retrofitting to provide required connection places within an already existing, data processing system represents no great amount of work or significant change of the associated, installed, data transmission network.

A further advantage of the invention is that the measuring device can be operated, without more, also with electrical, low power. Additionally, also the, on occasion, relevant, diverse explosion-protection specifications both for the measuring device as well as also for the measuring arrangement formed in conjunction with the connected data processing system can be e.g. met directly by forming the measuring device electronics by means of mutually spatially and/or galvanically sufficiently separated, circuit segments and/or by feeding the individual circuit segments of the measuring device electronics simultaneously via, in each case, a separate one of the at least two line-pairs, with each of these line-pairs being sent through associated circuit components appropriately limiting the input-side electrical power. The power limiters can be, as required, for example as also proposed in U.S. Pat. No. 7,113,375, coupled together and, thus, in the case of malfunction along one of the connecting lines, act simultaneously to limit power on both line-pairs. Alternatively to or in supplementation of a line-related, separate, internal voltage supply and power limiting, the at least two line-pairs, on occasion power-limited on the input separately in the aforementioned sense, can be connected together to form a common, internal voltage supply, for example by means of appropriate DC/DC converters, for example by means of a further voltage controller connected in each case on the secondary side. In case required, this voltage supply can, alternatively to or in supplementation of the aforementioned, separate, input-side, power limiting, be limited per specifications as regards maximum electrical power. By suitable sizing of the particularly used, power limiters to the above-mentioned, low-power level, it is thus also possible to have the measuring device also be suitable for use in those explosion-endangered environments in which only devices of intrinsic safety are permitted. Conversely, the minimal electric power nominally available to the measuring device can, in comparison with conventional two-conductor measuring devices, at least in the case of use of two conventional two-conductor current loops as line-pairs, be practically doubled by using each of the connecting lines not only for transmission of measured values but also, as proposed, for example in the above-mentioned U.S. Pat. No. 6,684,340, for feeding electrical energy into the measuring device.

BRIEF DESCRIPTION OF THE DRAWINGS

The invention will now be explained in greater detail on the basis of examples of embodiments as well as the figures of the drawing. Functionally equal parts are provided in the individual figures with equal reference characters, which are, however, then only repeated, when such appears to be useful. The figures of the drawing show as follows.

DETAILED DESCRIPTION OF EXEMPLARY EMBODIMENTS

Figure 1:
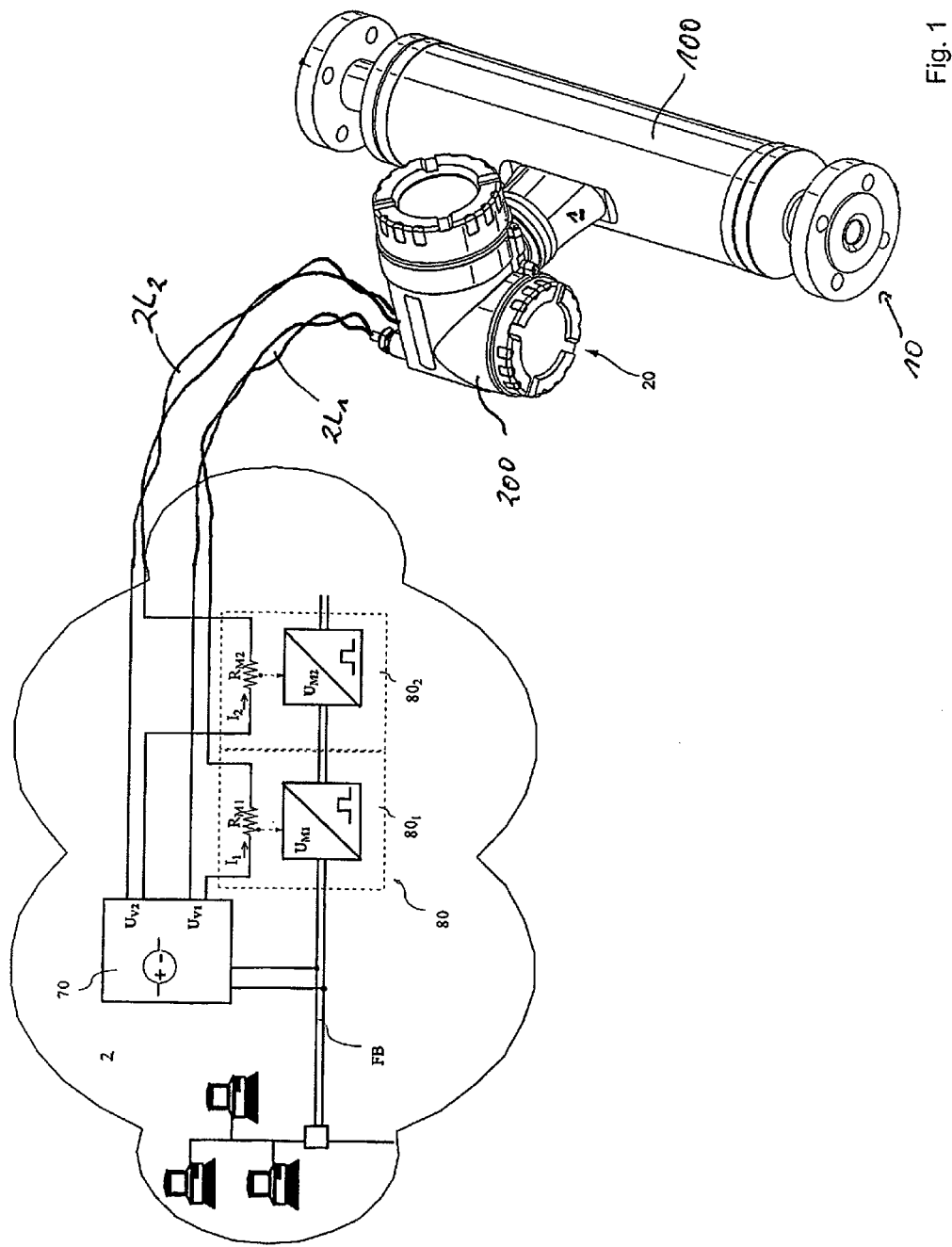
FIG. 1 a measuring arrangement formed by means of a measuring device and a superordinated, electronic, data processing system.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows an example of an embodiment of a measuring arrangement suited for use in industrial measurements and automation technology, in this case for registering chemical and/or physical, measured variables, especially of flowable, fluid media and/or flowable, solid, bulk media. The measuring arrangement includes for such purpose at least one measuring device 1, which repeatedly generates measured values representing the at least one measured variable to be registered, as well as an electronic, data processing system 2 superordinated to the at least one measuring device 1. The superordinated data processing system 2 can be, for example, a part of a process-near, automatic control or a wide-area, process control system, which has a multiplicity of process control computers and/or digital, programmable logic controllers, which are located spatially distributed within an industrial plant and coupled together via a corresponding data transmission network, especially also formed by means of digital fieldbusses. Equally, the data processing system can be connected with additional measuring devices and/or with control elements (such as e.g. valves or pumps) interacting with the process. In an embodiment of the invention, the measuring device 1 serves mainly for measuring and/or monitoring a mass flow m, a density $\rho$, a viscosity $\eta$, a volume flow, a flow velocity, a pressure p, a temperature $\theta$, a pH-value, a level, or the like, of a medium conveyed in a pipeline and/or contained in a container, especially a gas and/or a liquid, as well as for delivering repeatedly measured values representing these measured variables.

Measuring device 1, and the data processing system 2, which can be spatially well remote from the measuring device 1, are connected with one another by means of at least a first line-pair $2L_1$, through which a first current flows, at least at times, during operation, and by means of at least a second line-pair $2L_2$, through which a second current flows, at least at times, during operation.

The measuring arrangement of the invention is further so embodied that the measuring device transmits to the superordinated data processing system 2 the internally generated, measured values, be they measured values of diverse, registered, measured variables, such as e.g. a mass flow rate and a density of a medium flowing in a pipeline, or measured variables to be redundantly transmitted for one and the same measured variable. The measured values are transmitted to the superordinated data processing system at least partly via the first line-pair $2L_1$ and at least partly via the second line-pair $2L_2$. For capturing measured values transmitted from the measuring device, there is additionally provided in the data processing system at least one evaluating circuit 80 in communication with at least one of the line-pairs $2L_1$, $2L_2$. In an embodiment of the invention, the data processing system further includes at least one fieldbus FB, especially a serial fieldbus, serving for transmission of digital, measured values. The at least one fieldbus FB can be, for example, one based on one of the standards established in industrial process automation, such as e.g. FOUNDATION FIELDBUS, PROFIBUS or RACKBUS-RS 485. In an advantageous further development, it is further provided, in such case, that the aforementioned evaluating circuit is coupled to the at least one fieldbus, especially for forwarding of the measured values received from the measuring device.

In order that a measuring arrangement of the above-described kind can be implemented and operated, the measuring device electronics 20 and, as a result, the measuring device 1 as such, is provided with at least a first terminal pair for the first line-pair $2L_1$ and at least a second terminal pair for the second line-pair $2L_2$, in order to be appropriately connectable, in each case, to the assigned line-pair and, as a result, to the superordinated, electronic, data processing system 2. Additionally, the measuring device electronics 20 is designed for generating during operation a plurality of measured values, especially digital measured values, representing, at least in part, the at least one measured value, and for transmitting these, at least in part, via the first terminal pair and the first line-pair $2L_1$ appropriately connected thereto and, at least in part, via the second terminal pair and the line-pair $2L_2$ appropriately connected thereto. In case required, the measuring arrangement of the invention can be further developed to the effect that measuring device 1 and data processing system 2 are also connected with one another by means of an additional, third line-pair (not shown), through which flows, at least at times, a third current during operation. For this case, the measuring device can, additionally, transmit the internally generated, measured values, at least in part, to the data processing system also via the additional, third line-pair.

For producing the measured values, the measuring device 1 is further equipped with: A measuring transducer 10, which reacts to changes of at least one physical or chemical, measured variable and which delivers at least one measurement signal $s_1$ influenced by the at least one measured variable and, as a result, corresponds thereto, for example a variable signal voltage and/or a variable signal current; and a measuring device electronics, which is connected to the measuring transducer 10, receives the at least one measurement signal, and is shown, by way of example, schematically as measuring device electronics 20 in FIG. 2. Further, it is provided that the measuring device electronics 20 of the measuring device 1 produces the measured values at least partially taking into consideration the at least one measurement signal $s_1$. Measuring device 1 includes, in an advantageous embodiment, additionally a measuring transducer housing 100, which houses, at least partially, the measuring transducer 10. Moreover, measuring device 1 includes an electronics housing 200, in which the measuring device electronics 20, which is electrically connected in suitable manner with the measuring transducer 10, is accommodated. In a further, advantageous embodiment of the invention, the measuring transducer housing 100, with the measuring transducer located therein, and the electronics housing 200, with the measuring device electronics located therein, are mechanically, especially essentially rigidly, connected together to form a compact measuring device. In order that a measuring arrangement of the above-described kind can be realized and operated, the measuring device electronics is equipped with at least a first terminal-pair for the first line-pair $2L_1$ and at least a second terminal pair for the second line-pair $2L_2$, so that, in each case, the measuring device can be connected to the respective line-pair and, as a result, to the superordinated, electronic, data processing system. Additionally, the measuring device electronics is designed for generating during operation a plurality of measured values, especially digital, measured values, representing, at least in part, the at least one measured variable, and for transmitting these, at least in part, via the first terminal-pair and the line-pair $2L_1$ correspondingly connected thereto and, at least in part, via the second terminal-pair and the line-pair $2L_2$ connected thereto, to the connected data processing system. Each of the pairs (here, at least two) of electrical lines $2L_1$, $2L_2$ can, by itself, in such case, be embodied, for example, as part of a so-called two-conductor current loop, as proven in industrial measurements technology.

In the case of the measurement device shown by way of example in FIG. 1, such is an inline measuring device, which serves especially for registering measured variables, e.g. a mass flow, density and/or viscosity of a medium, especially a gas and/or a liquid, flowing in a pipeline (not shown) and for representing such in a measured value $X_{M1}$, $X_{M2}$ instantaneously representing these measured variables. Accordingly, the measuring device can be, for example, a Coriolis mass flow measuring device, a density measuring device or also a viscosity measuring device. For producing the at least one measurement signal, the illustrated measuring device further includes a measuring transducer 10 of vibration type accommodated within the measuring transducer housing 100 (here of essentially tubular form) and insertable into the course of the pipeline conveying the medium, so that the medium flows through it during operation. Construction and manner of operation of such measuring transducers of vibration type are known to those skilled in the art and are also described in detail in the initially mentioned WO-A 02/103327, WO-A 02/086426, WO-A 88/02476, WO-A 00/36379, U.S. Pat. Nos. 7,134,348, 7,073,396, 6,769,301, 6,711,958, 6,691,583, 6,666,098, 6,006,609, 5,796,011, 5,687,100, 5,602,345, 5,359,881, 5,301,557, 5,231,884, 4,768,384, US-A 2006/0179956, US-A 2006/0161359, US-A 2006/0112774, US-A 2006/0096390, or US-A 2005/0139015. It is, however, to be noted here that, although the measuring device presented in the example of an embodiment is an inline measuring device with a measuring transducer of vibration-type, the invention can, of course, also be used in inline measuring devices involving another type of measuring transducer, for example inline measuring devices using magneto-inductive measuring transducers and acoustic measuring transducers. Equally, the present invention can be used also in other types of field devices, for example in measuring devices used for measuring measured variables relating to the storage of media in containers, e.g. for measuring and/or monitoring levels. Measuring devices of this type are usually realized by means of measuring transducers which have at least one measuring probe protruding into a lumen of the container or at least communicating with the lumen, for example a microwave antenna, a Goubau line, a vibrating, immersive element, or the like.

In a further embodiment of the invention, the measuring transducer is so embodied that it reacts to changes of a measured value $X_1$ of a first kind to be registered, for example a mass flow rate m of a medium flowing in a pipeline, and to at least one measured variable $X_2$ of a second, different kind to be registered, for example a density ρ or a viscosity η of the same medium. Accordingly, the measuring transducer is additionally so embodied that the at least one measurement signal $s_1$ delivered by the measuring transducer also represents the measured variable of the second kind. Alternatively thereto, or in supplementation thereof, the measuring transducer can also be so embodied that it delivers at least a first measurement signal $s_1$ and a second measurement signal $s_2$. Coupled with this, the measuring device electronics can produce the measured values at least partially taking into consideration the first and second measurement signals $s_1$, $s_2$.

Figure 2:
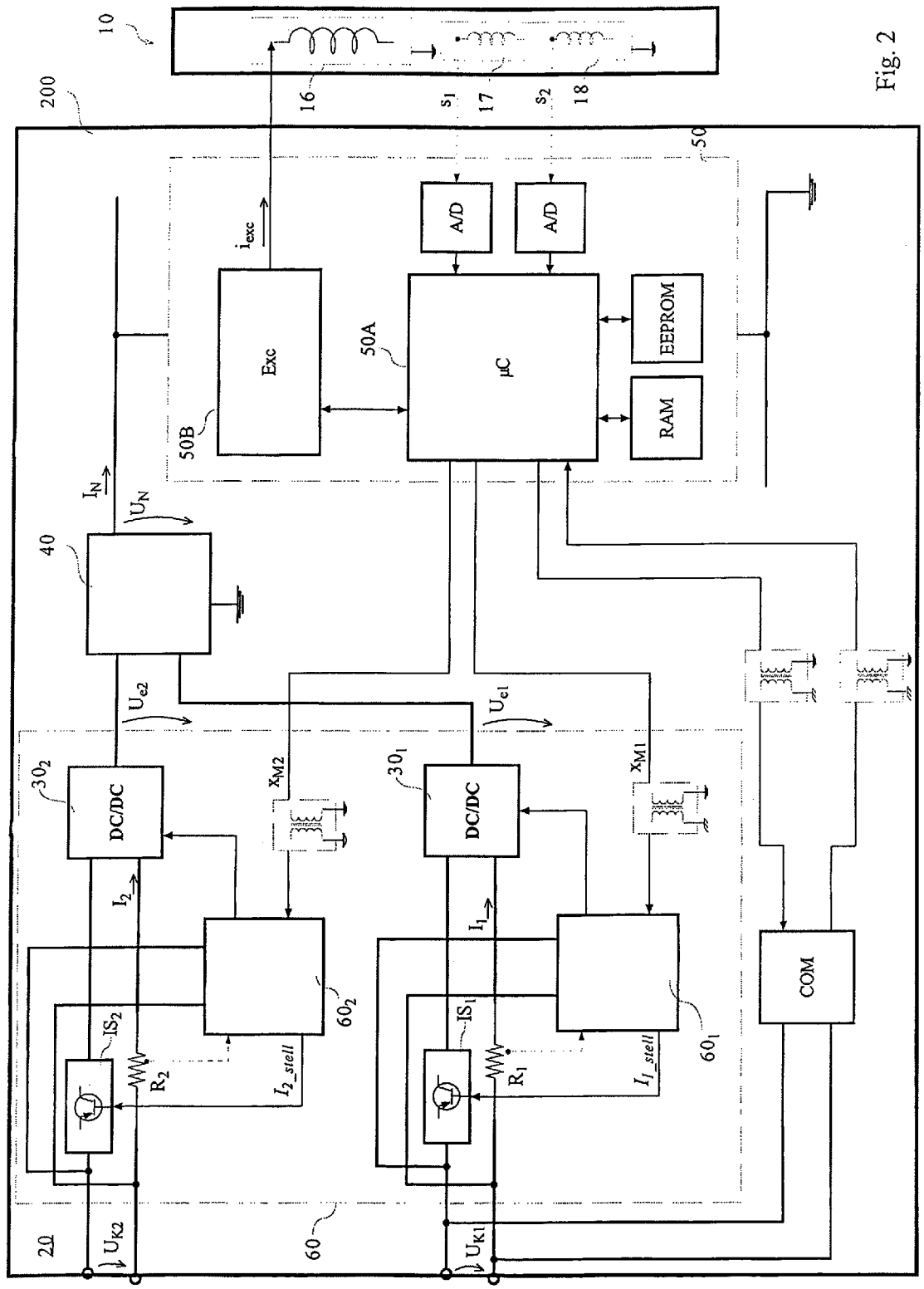
FIG. 2 a block circuit diagram of a measuring device electronics suited for use in a measuring device of FIG. 1.

FIG. 2 shows schematically, in the form of a block circuit diagram, an embodiment of a measuring device electronics 20 suited for the inline measuring device of FIG. 1. To the right of FIG. 2, the measuring transducer is indicated, here in the form of the already mentioned measuring transducer of vibration-type with at least one measuring tube, an exciter mechanism 16, especially an electrodynamic exciter mechanism, acting thereon for causing the measuring tube to vibrate, and a sensor arrangement 17, 18, especially an electrodynamic sensor arrangement, for registering vibrations of the at least one measuring tube and for producing the at least one measurement signal $s_1$, here representing vibrations of the at least one measuring tube. For producing the measured values, there is provided in the measuring device electronics an operating and evaluating circuit 50, which activates the measuring transducer via the exciter mechanism 16 and which receives the at least one measurement signal $s_1$, here generated by means of the sensor arrangement. The first measurement signal $s_1$ and the, on occasion, also present, second measurement signal $s_2$, of which each usually exhibits a signal frequency corresponding to the instantaneous oscillation frequency of the measuring tube 13, are, as shown in FIG. 2, fed to a preferably digital, evaluating unit 50A, of the operating and evaluating circuit 50 provided in the measuring device electronics 20. The evaluating unit 50A serves for determining, especially numerically, a measured value $X_{M1}$ of the first kind instantaneously representing the measured variable to be registered, here e.g. the mass flow, etc., and to convert such into an appropriately corresponding measured value signal $X_{M1}$, which is available at the output of the operating and evaluating circuit. Moreover, the evaluating unit 50A serves, in an embodiment of the invention, also for determining, especially numerically, in addition to the measured value $X_{M1}$ of the first kind, at least one measured value $X_{M2}$ of the second kind, instantaneously representing a further measured variable to be registered, here e.g. the density and/or viscosity of the medium. Equally, the evaluating unit 50A serves further also to convert the measured value $X_{M2}$ of the second kind into an appropriately corresponding, measured value signal $X_{M2}$ available at the output of the operating and evaluating circuit 50. While, in the case of the measuring transducer shown here, the density or also the viscosity are quite ascertainable on the basis of just one of the measurement signals $s_1$, $s_2$, for the case in which the mass flow is to be measured, both measurement signals $s_1$, $s_2$ are used in manner known to those skilled in the art, in order, for example in the signal time-domain or in the signal frequency-domain, to ascertain a phase difference corresponding to the mass flow rate.

In an embodiment of the invention, the evaluating unit 50A is implemented in the measuring device electronics 20 using a microcomputer, which is so programmed that it repetitively determines, on the basis of the measurement signals delivered by the sensor arrangement 17, 18, the measured value $X_{M1}$ of the first kind and, should the occasion require, the measured value $X_{M2}$ of the second kind. The microcomputer can be realized e.g. on the basis of suitable microprocessors and/or modern signal processors. As shown further in FIG. 2, the evaluating unit 50 further includes at least one A/D converter, via which one of the sensor signals $s_1$, $s_2$, or, as usual especially in the case of Coriolis mass flow transducers, a signal difference derived earlier from the two sensor signals $s_1$, $s_2$, is digitized for feeding to the microprocessor. The measurement and/or operating data produced by the evaluating unit 50A and/or the measurement and/or operating data received can further be stored volatility and/or persistently in appropriate digital data memories RAM, EEPROM.

As already mentioned, the operating and evaluating circuit 50 contains additionally a driver unit 50B serving for feeding the exciter mechanism 16 with the mentioned exciter current $i_{exc}$. For practical purposes, the driver unit 50B forms, together with the measuring tube 13, a control loop. This control loop is so designed that it tunes electrically both to the mechanical resonance frequency of the excited vibrations of the measuring tube 13 and also to the amplitude of these vibrations as specified by means of the reference signal Sr. The driver unit 50B can, in such case, be formed in the usual manner by means of a phase-locked loop, a so-called PLL, for electrical controlling of the resonance frequency as well as also the phase position of the driver signal and by means of a corresponding amplitude control stage for the electrical controlling of the amplitude of the driver signal and, as a result, also of the vibration amplitude. As shown in FIG. 2, the driver unit 50B is also connected with the evaluating unit 50A, especially with the already mentioned microprocessor μC, from which the driver unit 50B receives e.g. the required operating data, such as e.g. the desired instantaneous exciter frequency and/or the desired instantaneous amplitude for the exciter current, and, on occasion, the desired phase, or to which the driver unit 50B sends internally produced tuning signals and/or parameters, especially also information concerning the tuned exciter current $i_{exc}$ and/or the exciter power $P_{exc}$ fed into the measuring transducer. The operating data for the driver unit 50B, exciter frequency, amplitude and/or phase, can, in such case, be both absolute as well as relative values. Alternatively thereto or in supplementation thereof, the operating data transmitted to the driver unit 50B can also represent incremental, or decremental, changes of exciter frequency, amplitude and/or phase. In addition to the microprocessor μC, the operating and evaluating circuit 50 can also include, for example, a signal generator serving for producing the driver signal, for example a digital signal processor or a programmable logic component configured correspondingly as a signal generator.

The measuring electronics and, as a result, the measuring device itself is, furthermore, fed from an external electrical energy, or power, supply 70 provided in the superordinated data processing system. The energy source can be, in such case, e.g. a battery or a DC or AC voltage source fed via a plant-internal, supply network. During operation, the energy supply 70 provides at least one, especially unipolar, supply voltage $U_{V1}$, which drives at least the variable current $I_1$ flowing in the line-pair $2L_1$. For this purpose, the measuring device electronics is electrically connected during operation with the external energy supply 70 via at least the first pair of electrical lines $2L_1$. Due to the naturally occurring voltage drops between external energy supply and input of the measuring device electronics 20, the supply voltage $U_V$ is reduced to the terminal voltage $U_{K1}$ actually lying on the input of the measuring device electronics. In a further embodiment of the invention, equally also the current $I_2$ flowing in the second pair $2L_2$ of electrical lines is driven from a correspondingly provided supply voltage on the part of the data processing system. This supply voltage also is reduced to the terminal voltage $U_{K2}$ actually lying on the input of the measuring device electronics, due to corresponding voltage drops over the second line-pair $2L_2$. In such case, the aforementioned supply voltage for the current $I_2$ flowing in the line-pair $2L_2$, as well as the supply voltage for the current $I_1$ in the other line-pair $2L_1$, and, in association therewith, the, in each case, directly dependent terminal voltages $U_{K1}$, $U_{K2}$ can be taken from a common voltage source and can, therefore, be directly dependent on one another. In other words, the currents $I_1$, $I_2$ in the two line-pairs $2L_1$, $2L_2$ can be driven by practically one and the same supply voltage $U_V$. It can, however, also be of advantage to provide, alternatively thereto, in the data processing system, two voltage sources largely independent of one another, of which a first provides a first supply voltage $U_{V1}$ for the first line-pair $2L_1$, which drives, at least at times, the first current $I_1$ flowing through the line-pair $2L_1$, and of which a second provides a second supply voltage $U_{V2}$ for the second line-pair $2L_2$, which drives, at least at times, the second current $I_2$ flowing through the line-pair $2L_2$. In an embodiment of the invention, it is further provided that, as also shown in FIG. 1, the measuring device electronics is connected, electrically effectively, with the external energy supply, at least at times, solely via exactly two line-pairs $2L_1$, $2L_2$. Further, in the case of this embodiment of the invention, it is provided that, then, on the one hand, the measured values produced at least at times, are sent to the superordinated data processing system via these two, individual line-pairs $2L_1$, $2L_2$, and, on the other hand, the measuring device electronics and, as a result, the measuring device, is supplied with electrical energy via each of the two line-pairs $2L_1$, $2L_2$.

In an embodiment of the invention, the measured values $x_{M1}$ of a first kind generated internally during operation by the measuring device are transmitted to the data processing system by the technique wherein the measuring device adjusts an electrical current level of the current $I_1$, flowing, at least at times, through the first line-pair $2L_1$. Especially, it is provided in this case that the measuring device, for transmitting the measured values, varies the current $I_1$, flowing in the first line-pair $2L_1$ within a predetermined range of electrical current levels, for example within a current level range between 4 mA and 20 mA. Alternatively or in supplementation, the measuring device can transmit internally generated, measured values to the data processing system also by switching the current flowing in the first line-pair $2L_1$, for example by modulating the current $I_1$ in a rectangular waveform. For example, in such case, a switching frequency and/or a pulse width of the current flowing in the first line-pair $2L_1$ can be varied, especially such that, in final result, the switched current $I_1$ is modulated according to a digital transmission protocol. As can be seen in FIG. 2, the measuring device electronics 20 further includes, for the adjusting and control of the current $I_1$ flowing in the first line-pair $2L_1$ at least one current controller $IS_1$ flowed through thereby for adjusting or modulating, especially switching, the current $I_1$.

For registering and regulating the current $I_1$ instantaneously flowing in the first line-pair $2L_1$, the measuring device electronics 20 further includes a first measuring and control stage $60_1$, for example one fed by means of the terminal voltage $U_{K1}$. Especially, the measuring and control stage $60_1$ serves, particularly for the above-mentioned case in which at least the current $I_1$ is serving as signal carrier for measured values, also for converting the measured value signal $x_{M1}$ delivered by the operating and evaluating circuit 50 and internally representing the measured value $x_{M1}$ instantaneously to be transmitted, into a first electrical-current control signal $I_{1\_control}$ correspondingly controlling the current controller $IS_1$ and, as a result, also the current $I_1$. The measuring and control stage $60_1$ forms, in this respect, together with the current controller $IS_1$, for practical purposes, a current controller (here a so-called linear, longitudinal controller) for the current $I_1$ in the first line-pair $2L_1$. The electrical-current control signal $I_{1\_control}$ is, in an embodiment of the invention, so formed, that the aforementioned current controller is enabled to adjust the current $I_1$, taking into consideration the measured value $X_{M1}$ instantaneously to be transmitted via the first line-pair $2L_1$. Alternatively or in supplementation thereto, the current control signal $I_{1\_control}$ can, however, also be so formed, that the current controller switches the current $I_1$, for example for the purpose of binary-coded communication according to the standard PROFIBUS-PA.

In a further development of the invention, it is additionally provided that the measuring device transmits internally generated, measured values, for example measured values $X_{M2}$ of the second kind, to the data processing system by adjusting a current level of the current $I_2$ flowing, at least at times, through the second line-pair $2L_2$. Especially, in this case, it is also provided that the measuring device, for transmitting the measured values, varies the current $I_2$ flowing in the second line-pair within a predetermined range of electrical-current level, for example, again, within a range of electrical current level extending between 4 mA and 20 mA. Alternatively or in supplementation, the measuring device can, however, also transmit internally generated, measured values to the data processing system by switching the current flowing in the second line-pair $2L_2$. For example, also in this case, a clock frequency and/or a pulse width of the current $I_2$ flowing in the second line-pair $2L_2$ can be varied. In a further development of the invention, the measuring device electronics 20 includes, accordingly, for the adjusting and controlling of the current $I_2$ flowing in the second line-pair $2L_2$, additionally a second current controller $IS_2$ flowed through thereby, for the adjusting or modulating, especially switching, of the current $I_2$. For registering and regulating the current $I_2$ instantaneously flowing in the second line-pair $2L_2$, the measuring device electronics 20 includes further at least for this further development of the invention, a corresponding, first measuring and control stage $60_2$, for instance one fed by means of the terminal voltage $U_{K2}$. Especially, the measuring and control state $60_2$ serves, particularly for the above-mentioned case in which the current $I_2$ serves as signal carrier for measured values, also for converting the measured value signal $x_{M2}$ delivered by the operating and evaluating circuit 50 and internally representing the measured value $X_{M2}$ instantaneously transmitted via the second line-pair $2L_2$, into a second current control signal $I_{2\_control}$ correspondingly adjusting the current controller $IS_2$ and, as a result, also the current $I_2$. The measuring and control stage $60_2$ forms, in this respect, together with the current controller $IS_2$, a current controller (here again a so-called linear, longitudinal controller) for the current $I_2$ in the second line-pair $2L_2$. The current control signal $I_{2\_control}$ is, in an embodiment of this further development of the invention, so developed that the aforementioned current controller is enabled to adjust the current $I_2$ taking into consideration the measured value $X_{M2}$ instantaneously to be transmitted, proportionally thereto. Alternatively or in supplementation, the current control signal $I_{2\_control}$ is so developed, that the current controller switches the current $I_2$, for example for purpose of, again, binary-coded communication.

For producing appropriately electrical-current-representing, especially essentially current-proportional, sense-voltages $I_{1\_actual}$, $I_{2\_actual}$, additionally provided in the measuring device electronics 20 are sense resistors $R_1$, $R_2$ flowed through by the respective currents $I_1$, $I_2$, or current components split therefrom. These resistors can also serve, on occasion, additionally as electrical current limiters.

For the above-described case, in which measured values are transmitted to the superordinated data processing system via at least one line-pair by varying of the current $I_1$ flowing therein, it is additionally provided in a further development of the invention, as also proposed e.g. in the initially mentioned U.S. Pat. No. 6,684,340, that critical conditions within the measuring device or within the process monitored by means of the measuring device are signaled to the superordinated data processing system by means of a temporarily assumed current level of more than 20 mA, for example of about 22 mA, and/or by means of a temporarily assumed current level of less than 4 mA, for example of about 3.6 mA or even 0 mA.

In another embodiment of the invention, it is provided that the measuring device exchanges with an external control unit, for example a handheld accessing unit or a programmable logic controller (PLC) provided in the superordinated data processing system, at least at times, device-specific data, such as e.g. measuring-device internal, adjusting parameters for the measuring device electronics and/or measuring device internal, diagnosis parameters. For this purpose, provided in the measuring device electronics 20 is, further, at least one communications circuit COM, which supervises and controls communications via at least one of the line-pairs, here the first line-pair $2L_1$. Especially, the communications circuit serves for converting the device-specific data to be sent, into signals, which are transmittable via the corresponding pair of electrical lines, and then to couple these thereinto. Alternatively or in supplementation, the communications circuit COM can, however, also be designed for appropriately receiving device-specific data sent from the exterior over the relevant pair of electrical lines, for example a set of adjustment parameters to be changed in the measuring device electronics. The communications circuit COM can be e.g. an interface circuit working according to the HART @-Field-Communications-Protocol of the HART Communication Foundation, Austin, Tex., which uses higher frequency, FSK-coded (frequency shift keying), alternating voltages as signal carriers.

In a further embodiment of the invention, the measuring device is further so embodied that at least the first current $I_1$ flowing in the first line-pair $2L_1$ serves, at least in part or even completely, especially in addition to its use for transmission of measured values, serves also for supplying the measuring device with electrical energy. Accordingly, it is further provided that the measuring device covers its instantaneous energy requirement at least in part by means of the first current $I_1$. In a further embodiment of the invention, it is additionally provided that each of the two electrical currents, on occasion transmitting measured values, serve, at least at times and/or at least in part, for supplying the measuring device with electrical energy. In association therewith, the measuring device covers, moreover, its instantaneous energy requirement at least in part by means of the first current and at least in part by means of the second current. In a further embodiment of the invention, it is, in such case, additionally provided that the measuring device covers its instantaneous energy requirement completely by means of the first and second currents. When, thus, the measuring device works in each of the at least two line-pairs $2L_1$, $2L_2$ according to the above-mentioned 4 mA to 20 mA standard, long existing in the technology of industrial measurements, then there is permanently available for energy supply in normal operation, indeed, in each case, solely the current range below 4 mA, which, depending on the level of the supply voltage, does mean, in any event, about 80 to 180 mW (–milliwatts) of electrical power.

In a further embodiment of the invention, the measuring device electronics is, on the whole, further so designed and dimensioned that a maximum dissipated power is smaller than or, at most, equal to 1 W. For example, the measuring device electronics can be so designed and dimensioned that the field device is intrinsically safe, such that it satisfies the requirements for an intrinsic explosion safety (Ex-i), as established, for example, in the European Standards EN 50 014 and EN 50 020, as regards explosion protection. Alternatively or in supplementation, the first line-pair $2L_1$, in a further embodiment for further improvement of the explosion safety of the measuring device, is galvanically separated and/or spatially separated, especially partitioned or encapsulated, from the second line-pair $2L_2$, at least within the measuring device electronics. For example, the electronics housing 200 of the measuring device can have corresponding chambers for individual circuit sections or segments to be separated from one another.

As a result of the naturally limited electrical power of the external energy supply, the supply voltage $U_V$ delivered therefrom sinks and, associated therewith, also the terminal voltage $U_{K1}$, in the face of an increasing load current, here, thus, for example, the current $I_1$ and/or the current $I_2$, or, conversely, the supply voltage $U_V$ increases again, in the case of sinking load current. Thus, at least for the described case in which the current $I_1$ is modulated as regards its amplitude both for the energy supply of the measuring device as well as also for the purpose of representing the measured value $X_{M1}$, the supply voltage $U_V$ and, as a result, also the terminal voltage $U_{K1}$, are to be considered as fluctuating as regards their voltage level, in a manner which can not be anticipated and, as a result, are to be viewed as variable to a considerable degree during operation.

The measuring device electronics 20 includes, therefore, in a further embodiment of the invention, additionally at the input, a first voltage converter $30_1$, especially embodied as a DC voltage converter, coupled on the primary side with the first line-pair $2L_1$. The voltage converter can be a conventional DC/DC converter. Examples for such DC/DC converters known per se to those skilled in the art are disclosed in, among others, U.S. Pat. Nos. 7,075,801, 6,982,574, 6,714, 428, 6,535,400 or 6,466,462. The voltage converter $30_1$, controlled by an associated, first measuring and control stage $60_1$, is provided for setting as accurately as possible and largely stabilizing an input voltage $U_{e1}$ of the measuring device electronics 20, especially a unipolar input voltage, serving as primary, or base, voltage for the further, internal, energy supply, at a predeterminable, voltage level, which can, on occasion, also be variable during operation. Additionally, the input voltage controller $30_1$, $60_1$ formed by the interaction of measuring and control stage $60_1$ and voltage converter $30_1$ serves also for holding the input voltage $U_{e1}$, at least for undisturbed, normal operation, in which, among other things, the terminal voltages $U_{K1}$, $U_{K2}$ are at least equal to a minimal voltage value, also as constant as possible at this voltage level selected for the moment. This can be achieved, for example, by a correspondingly matched switching of the voltage converter $30_1$. Alternatively to a quasi constant voltage level for the input voltage $U_{e1}$, it is, however, also possible here to change the input voltage $U_{e1}$ e.g. stepwise, for example upon the exceeding or falling beneath of correspondingly specified threshold values for at least one current $I_1$, $I_2$ and/or at least one of the terminal voltages $U_{K1}$, $U_{K2}$, and, therefore keeping the voltage level for the input voltage $U_{e1}$ constant only over certain ranges of electrical current levels of the currents $I_1$, $I_2$ and, as a result, also over corresponding voltage ranges of the terminal voltages $U_{K1}$, $U_{K2}$. In case required, the voltage level for the internal input voltage $U_{e1}$ can, however, for instance by the omission of a voltage control, also be kept essentially continuously variable during operation, as a function of the instantaneously flowing current $I_1$.

In a further embodiment of the invention, the aforementioned input voltage controller $30_1$, $60_1$ is so constructed that the voltage level for the input voltage $U_{e1}$ is held constant after the reaching of a predetermined or predeterminable, maximum voltage level $U_{e1\_max}$, for example in the order of magnitude of 15 V, despite possibly further increase of the terminal voltage $U_{K1}$, for example to above 20 V. As a result, thus this input voltage controller $30_1$, $60_1$ acts not only as a voltage stabilizer for the internal input voltage $U_{e1}$ but also serves then also as a voltage limiter therefor.

Alternatively to or in supplementation of, stabilizing the input voltage $U_{e1}$, the voltage converter $30_1$ can also serve for the galvanic separation of downstream circuit components of the measuring device electronics 20 from the circuit components of the entire measuring arrangement situated before the voltage converter $30_1$, especially the associated line-pair $2L_1$, as well as the superordinated data processing system connected upstream therefrom. This can be realized in very simple manner e.g. by use of a transformer in the intermediate current loop of the voltage converter $30_1$, which carries an alternating current during operation.

In another embodiment of the invention, there is further provided at the input a second voltage converter $30_2$ coupled on the primary side with the second line-pair $2L_2$, especially a voltage converter embodied as a DC voltage converter, which, controlled by an associated, second measuring and control stage $60_2$, is provided for adjusting an, especially unipolar, input voltage $U_{e2}$ of the measuring device electronics 20, serving as a second primary or base voltage for further internal energy supply, likewise to a predeterminable voltage level (which can, during operation, also be variable) as accurately as possible, as well as, at least for undisturbed, normal operation, in which, among other things, the terminal voltages $U_{K1}$, $U_{K2}$ are each at least equal to a minimum voltage value, to keep such as much as possible constant at this instantaneously selected voltage level, for example again by a suitable switching. Alternatively or in supplementation thereto, the voltage converter $30_2$ can equally as in the case of the first voltage converter $30_1$ also serve for the galvanic separation of downstream circuit components of the measuring from the circuit components of the whole measuring arrangement situated upstream of the voltage converter $30_2$, especially also the associated line-pair $2L_2$, as well as the superordinated data processing system connected thereto.

In an embodiment of this further development of the invention, it is further provided that the two voltage converters $30_1$, $30_2$ and/or the two measuring and control stages $60_1$, $60_2$ are constructed essentially equally to one another. In another embodiment of this further development of the invention, the two voltage converters $30_1$, $30_2$ are electrically coupled together, especially galvanically connected, on the secondary side.

For further internal distribution of the electrical energy to individual components or assemblies of the measuring device electronics 20, such additionally includes, in a further development of the invention, an internal supply circuit 40, which lies at the internal, first, input voltage $U_{e1}$ stemming, at least in part, from the terminal voltage $U_{K1}$ and, as shown here, which lies optionally also at the second input voltage $U_{e2}$. Supply circuit 40 processes the stabilized, internal input voltage $U_{e1}$, on occasion also the input voltage $U_{e2}$, or even a voltage $U_{e1}+U_{e2}$ composed of the two input voltages $U_{e1}$, $U_{e2}$, and provides, as schematically indicated in FIG. 2, during operation, at least one internal useful-voltage $U_N$, which drives an internal useful-current $I_N$ flowing through the internal operating and evaluating circuit 50 and, consequently, electrically feeds the internal operating and evaluating circuit 50. In an embodiment of this further development of the invention, the supply circuit 40 delivers the at least one useful voltage $U_N$ essentially constantly controlled at a predeterminable voltage level $U_{N\_desired}$, which, as required, is parameterable at startup and/or during operation. For controlling the useful voltage $U_N$, for example so-called switching controllers and/or unswitched, linear controllers can be used. Furthermore, for compensating possible fluctuations and/or differences of the input voltages $U_{e1}$, $U_{e2}$ applied on the primary side in possibly unsmoothed form, corresponding smoothing capacitors and/or chokes can be provided at the input of the supply circuit 40. For the above-described case, in which the measuring electronics 20 includes at least two voltage converters $30_1$, $30_2$ for the providing of corresponding input voltages $U_{e1}$, $U_{e2}$, control of the internal useful voltage $U_N$ is simplified in a further embodiment of the invention by switching the two voltage converters $30_1$, $30_2$, during operation, at essentially the same frequency. Additionally, it can, in such case, be of advantage to switch the two voltage converters $30_1$, $30_2$, during operation, out of phase relative to one another, especially with opposite phase. For the case, in which the input voltages $U_{e1}$, $U_{e2}$ made available on the input sides are direct voltages, a high efficiency of the subsequent voltage control for the further internal voltage supply can be achieved in very simple manner. Alternatively to the above-described, largely synchronized and/or equal-frequency switching of the at least two voltage converters $30_1$, $30_2$, it can, however, also be quite sufficient to switch the two voltage converters $30_1$, $30_2$, at least at times, asynchronously or with frequencies different from one another.

For the above-described case, in which the measured values are transmitted to the superordinated data processing system at least partially by an appropriately matched electrical current level of the current $I_1$ and/or $I_2$, it can sometimes be necessary, in the case of high electrical current levels, suitably to eliminate possibly excess electrical power. This can be achieved, for example, by providing in the supply circuit 40 connected to the wanted voltage $U_N$ a Z-diode circuit and/or a shunt- or cross-regulator, with a corresponding diversion current flowing through the Z-diode circuit and/or cross regulator when there is excess power present in the measuring device electronics 20, so that the excess electrical power is dissipated as heat. Alternatively thereto or in supplementation thereof, the elimination of excess electrical power can be achieved by means of appropriately sized voltage converters $30_1$, $30_2$, with these operating in the case of excess power in a mode characterized by a comparatively poor efficiency and in the case of less available power in a mode characterized by a highest possible efficiency.

In another embodiment of the invention, voltage limiters are placed in the first and/or second line-pair, especially at the input of the measuring device electronics, for limiting, to allowable maximum values, overvoltage possibly applied to the input of the measuring device electronics. The voltage limiters can be formed, for example, by means of diodes provided at the input of the measuring device electronics 20 and/or in the aforementioned voltage converter $30_1$ and/or in the, at times present, voltage converter $30_2$. Alternatively to, or in supplementation of, the voltage limiters, current limiters are placed in the first and/or second line-pair, especially at the input of the measuring device electronics. These current limiters limit, in the respective line-pairs, possibly flowing, short circuit currents to allowable maximum values. The current limiters can be formed, for example, by means of resistances and/or fuses placed in the lines.

In a further embodiment of the invention, it is additionally provided that the at least two line-pairs $2L_1$, $2L_2$ are kept galvanically separated from one another, at least within the measuring device electronics. To this end, the measuring device electronics includes in a further development of the invention at least one transformer. This can be formed in simple manner, for example, by means of two primary coils, of which one is placed in the course of the first line-pair $2L_1$ and another in the course of the second line-pair $2L_2$, and by means of a common secondary coil magnetically coupled with the two primary coils. The transformer can then, for example, supplemented on the primary side by corresponding rectangular modulators and on the secondary side by corresponding demodulators, serve as component of a converter connected equally to the at least two line-pairs $2L_1$, $2L_2$, and converting the corresponding supplied voltages commonly to a correspondingly composed voltage. Depending on need, the at least one transformer can additionally be correspondingly supplemented by further transformers inserted into the course of individual current paths existing internally of the measuring device electronics. Alternatively thereto or in supplementation thereof, the measuring device electronics can have one or more optocouplers inserted into the course of individual current paths existing internally of the measuring device electronics, in order to effect galvanic separation of the two line-pairs. Moreover, it can also be of advantage likewise to keep, on the input side, circuit components of the measuring device electronics 20, for example the possibly present current controllers $IS_1$, $IS_2$ and/or the possibly present measuring and control stages $60_1$, $60_2$, galvanically separated from downstream circuit components of the measuring device electronics 20, especially the operating and evaluating circuit 50.

As already mentioned above, the measuring device electronics and thus also the measuring device are fed from at least one external electrical energy supply 70 provided in the superordinated data processing system 2. The energy supply 70 is connected with the measuring device electronics 20 via at least one of the pairs of electrical lines $2L_1$, $2L_2$. Additionally provided in the data processing system 2 is at least one external evaluating circuit 80 for evaluating the measured values sent from the measuring device. Evaluating circuit 80 can, as required, also be embodied as a plurality of components. In turn, evaluating circuit 80 can be connected via the fieldbus system with a programmable logic controller (PLC) and/or a superordinated process-computer located in a process control room. In the case of the example shown in FIG. 1, the evaluating circuit 80 is formed by means of a first evaluating circuit portion $80_1$ communicating with the first line-pair, for registering measured values transmitted via the first line-pair, as well as by means of a second evaluating circuit portion $80_2$ communicating with the second line-pair, for registering measured values transmitted via the second line-pair.

For producing appropriately electrical current representing, measurement voltages, especially measurement voltages proportional to current, a further development of the invention provides in the data processing system, for example integrated directly into the evaluating circuit 80, measuring resistors, through which flow respective currents $I_1$, $I_2$, or current portions split therefrom. The measuring resistors can, as well, serve also for electrical current limitation. Each of the at least two line-pairs $2L_1$, $2L_2$ can, for example, be connected in series with the energy source supplying its respective current $I_1$, $I_2$ and with the corresponding measuring resistor. Each measuring resistor can, additionally, be provided with appropriate measurement terminals, across which an electrical current proportional, measurement voltage can be tapped to measure the electrical current $I_1$, $I_2$ instantaneously representing a respectively transmitted, measured value.

At least for the above-described case, in which at least the current $I_1$ flowing in the first line-pair $2L_1$ serves as signal carrier for measured values to be carried via the first line-pair $2L_1$, a further embodiment of the invention provides that the data processing system has additionally at least a first measuring resistor $R_{M1}$, through which, at least at times, the first current $I_1$ flows, and that the at least one evaluating circuit 80 registers, at least at times, a measurement voltage $U_{M1}$ dropping essentially across the first measuring resistor $R_{M1}$ and corresponding with the first current $I_1$. Equally, the data processing system further includes, at least in the case in which the current $I_2$ flowing also in the second line-pair $2L_2$ serves as signal carrier for measured values to be carried via the second line-pair $2L_2$, at least a second measuring resistor $R_{M2}$ through which flows, at least at times, the second current $I_2$. Additionally, then the at least one evaluating circuit 80 of the data processing system 2 registers, at least at times, a measurement voltage $U_{M2}$ falling essentially across the second measuring resistor $R_{M2}$ and corresponding with the second current $I_2$. In the example of an embodiment shown in FIG. 1, the measuring resistor $R_{M1}$ for the first line-pair $2L_1$ is arranged directly in the first evaluating circuit portion $80_1$, while the measuring resistor $R_{M2}$ for the second line-pair $2L_2$ is placed directly in the second evaluating circuit portion $80_2$. Finally, the evaluating circuit 80 formed by means of the at least two evaluating circuit portions can be constructed, for example, in cooperation with two current-to-fieldbus converters, especially fieldbus-capable converters, each embodied in conventional two-wire technology. In such case, the external energy supply 70 can, e.g., as shown by way of example in FIG. 1, be embodied as an energy supply module centrally feeding the at least two line-pairs $2L_1$, $2L_2$. Alternatively, it is, however, also possible to implement the external energy supply 70 and evaluating circuit 80 in such a manner that each of the at least two line-pairs $2L_1$, $2L_2$ is connected, in each case, to a conventional measurement transmitter feeding device, especially a fieldbus capable one, with each of the measurement transmitter feeding devices being partially both for supply of the measuring device 1 as well as also for converting measured values transmitted from the measuring device. The measurement transmitter feeding devices can be embodied, for example, in each case, as a conventional hat-rail module. Finally, also other, especially also conventional, two-wire interfaces can be provided in the data processing system for operation of the measuring device.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measuring arrangement for registering chemical and/or physical, measured variables, comprising:
   at least one measuring device, which, by means of internal measuring device electronics, repeatedly generates, during operation, measured values representing at least one measured variable to be registered; and
   an electronics data processing system superordinated to said at least one measuring device; wherein:
   said measuring device and said electronics data processing system are connected to one another by means of at least a first line-pair, through which a first electrical current flows, at least at times, during operation, and by means of at least a second line-pair, through which a second electrical current flows, at least at times, during operation;
   said measuring device transmits internally generated, measured values to said electronics data processing system at least partially via said first line-pair and at least partially via said second line-pair; and
   for transmitting internally generated, measured values to said electronics data processing system, the measuring device: sets an electrical current level of the current flowing, at least at times, through said first line-pair, and/or sets an electrical current level of an electrical current flowing, at least at times, through said second line-pair.

2. A measuring arrangement for registering chemical and/or physical, measured variables, comprising:
   at least one measuring device, which, by means of internal measuring device electronics, repeatedly generates, during operation, measured values representing at least one measured variable to be registered; and
   an electronics data processing system superordinated to said at least one measuring device; wherein:
   said measuring device and said electronics data processing system are connected to one another by means of at least a first line-pair, through which a first electrical current flows, at least at times, during operation, and by means of at least a second line-pair, through which a second electrical current flows, at least at times, during operation;
   said measuring device transmits internally generated, measured values to said electronics data processing system at least partially via said first line-pair and at least partially via said second line-pair; and
   for transmitting internally generated, measured values to said electronics data processing system, the measuring device: varies the current flowing in said first line-pair within a predetermined range of electrical current levels, and/or switches the current flowing in said first line-pair, and/or varies the current flowing in said second line-pair within a predetermined range of electrical current levels, and/or switches the current flowing in said second line-pair.

3. The measuring arrangement as claimed in claim 2, wherein:
   the measuring device transmitts internally generated, measured values to said electronics data processing system: by varying the current flowing in said first line-pair within a range between 4 mA and 20 mA, and/or by varying a switching frequency and/or a pulse width of the electrical current flowing in said first line-pair, and/or by varying the current flowing in said second line-pair within a range between 4 mA and 20 mA, and/or by varying a switching frequency and/or a pulse width of the electrical current flowing in said second line-pair.

4. The measuring arrangement as claimed in claim 2, wherein:
   the data processing system provides at least one supply voltage, which drives both the current flowing through said first line-pair as well as also the current flowing through said second line-pair.

5. The measuring arrangement as claimed in claim 2, wherein:
   the measuring device includes at least one measuring transducer reacting to at least one measured variable to be registered, said measuring transducer delivering to the measuring device electronics at least one measurement signal corresponding at least with the measured variable.

6. The measuring arrangement as claimed in claim 5, wherein:
the measuring device electronics of the measuring device produces the measured values at least partially by taking into consideration the at least one measurement signal.

7. The measuring arrangement as claimed in claim 6, wherein:
said measuring transducer reacts to changes of a measured variable of a first kind to be registered and to at least one measured variable of a second kind to be registered; and/or
said measuring transducer delivers at least a first measurement signal and a second measurement signal.

8. The measuring arrangement as claimed in claim 6, wherein:
said measuring transducer reacts to changes of a measured variable of a first kind to be registered and to at least one measured variable of a second kind to be registered and said at least one measurement signal delivered from said measuring transducer also represents the measured variable of the second kind; and/or
said measuring transducer delivers at least a first measurement signal and a second measurement signal and the measuring device electronics produces the measured values at least partially by taking the first and second measurement signals into consideration.

9. The measuring arrangement as claimed in claim 5, wherein:
the measuring device further includes a transducer housing at least partially housing the measuring transducer.

10. The measuring arrangement as claimed in claim 9, wherein:
the measuring device further includes: an electronics housing, which houses the measuring device electronics, and a transducer housing at least partially housing the measuring transducer.

11. The measuring arrangement as claimed in claim 10, wherein:
said measuring transducer housing and said electronics housing are mechanically connected together; and/or
said measuring transducer housing and said electronics housing are essentially rigidly connected together.

12. The measuring arrangement as claimed in claim 2, wherein:
the measuring device and said electronics data processing system are further connected with one another by means of at least a third line-pair, through which a third electrical current flows, at least at times, during operation, and the measuring device transmits internally generated, measured values to the data processing system at least partially also via said third line-pair.

13. The measuring arrangement as claimed in claim 2, wherein:
said electronics data processing system further includes: at least one evaluating circuit communicating with at least one of said line-pairs for registering measured values transmitted from the measuring device, and at least one fieldbus serving for transmission of digital, measured values.

14. The measuring arrangement as claimed in claim 13, wherein: the at least one evaluating circuit of said electronics data processing system is coupled to the at least one fieldbus; and/or
the at least one fieldbus is a serial fieldbus.

15. The measuring arrangement as claimed in claim 2, wherein:
said electronics data processing system further includes at least a first measuring resistor, through which the first current flows, at least at times, and at least one evaluating circuit for registering measured values transmitted from the measuring device, said evaluating circuit registering, at least at times, a measurement voltage dropping across said first measurement resistor and corresponding with the first current.

16. The measuring arrangement as claimed in claim 15, wherein:
said electronics data processing system further includes at least a second measuring resistor, through which flows, at least at times, a second electrical current.

17. The measuring arrangement as claimed in claim 16, wherein:
said electronics data processing system further includes at least one evaluating circuit for registering measured values transmitted from the measuring device and said evaluating circuit registers, at least at times, a measurement voltage essentially dropping across said second measurement resistor and corresponding with the second electrical current.

18. The measuring arrangement as claimed in claim 2, wherein:
said electronics data processing system further includes a first evaluating circuit portion communicating with said first line-pair for registering measured values transmitted via said first line-pair, and a second evaluating circuit portion communicating with said second line-pair for registering measured values transmitted via said second line-pair, said first evaluating circuit registering, at least at times, a measurement voltage dropping essentially across a measuring resistor through which the first current flows, and/or said second evaluating circuit portion registering, at least at times, a measurement voltage dropping essentially across a measurement resistor, through which the second current flows.

19. The use of a measuring arrangement as claimed in claim 2 for measuring a medium flowing in a pipeline and/or held in a container.

20. A measuring arrangement for registering chemical and/or physical, measured variables, comprising:
at least one measuring device, which, by means of internal measuring device electronics, repeatedly generates, during operation, measured values representing at least one measured variable to be registered; and
an electronics data processing system superordinated to said at least one measuring device; wherein:
said measuring device and said electronics data processing system are connected to one another by means of at least a first line-pair, through which a first electrical current flows, at least at times, during operation, and by means of at least a second line-pair, through which a second electrical current flows, at least at times, during operation;
said measuring device transmits internally generated, measured values to said electronics data processing system at least partially via said first line-pair and at least partially via said second line-pair;
the measuring device transmits internally generated, measured values to the data processing system, by setting an electrical current level of the current flowing, at least at times, through said first line-pair; and/or at least the first electrical current serves, as least partially also for supplying the measuring device with electrical energy; and/or each of the two currents serves, at least at times and/or at least in part, also for supply of the measuring device with electrical energy; and/or the measuring device covers its instantaneous energy requirement at least partially by means of the first current; and/or the measuring device covers its instantaneous energy requirement at least in part by means of the first current and at least in part by means of the second current; and/or the measuring device covers its instantaneous energy requirement completely by means of the first and second currents; and/or voltage limiters are placed in said first line-pair and/or said second line-pair for limiting an electrical overvoltage possibly applied to the input of the measuring device electronics to an allowable, maximum value; and/or electrical current limiters are placed in said first line-pair and/or in said second line-pair for limiting a short circuit current possibly flowing in a line-pair to an allowable, maximum value; and/or said first line-pair is galvanically and/or spatially separated from said second line-pair, at least within the measuring device electronics; and/or said electronics data processing system provides at least one supply voltage, which drives at least the current flowing through said first line-pair; and/or the measuring device includes at least one measuring transducer, said measuring transducer reacting to at least one measured variable to be registered, and said measuring transducer delivering to the measuring device electronics at least one measurement signal corresponding at least with the measured variable; and/or the measuring device further includes an electronics housing, which houses the measuring device electronics; and/or the measuring device and said electronics data processing system are further connected with one another by means of at least a third line-pair, through which a third electrical current flows, at least at times, during operation; and/or said electronics data processing system further includes at least one evaluating circuit communicating with at least one of said line-pairs for registering measured values transmitted from the measuring device; and/or said electronics data processing system further includes at least a first measuring resistor, through which the first current flows, at least at times; and/or said electronics data processing system further includes a first evaluating circuit portion communicating with said first line-pair for registering measured values transmitted via said first line-pair, and a second evaluating circuit portion communicating with said second line-pair for registering measured values transmitted via said second line-pair; and/or said electronics data processing system is spatially distributed and/or spatially remote from the measuring device.

21. A measuring arrangement for registering chemical and/or physical, measuring variables, comprising:

at least one measuring device, which, by means of internal measuring device electronics, repeatedly generates, during operation, measured values representing at least one measured variable to be registered; and an electronics data processing system superordinated to said at least one measuring device; wherein:

said measuring device and said electronics data processing system are connected to one another by means of at least a first line-pair, through which a first electrical current flows, at least at times, during operation, and by means of at least a second line-pair, through which a second electrical current flows, at least at times, during operation;

said measuring device transmits internally generated, measured values to said electronics data processing system at least partially via said first line-pair and at least partially via said second line-pair;

the measuring device transmits internally generated, measured values to the data processing system, by setting an electrical current level of the current flowing, at least at times, through said first line-pair; and/or at least the first electrical current serves, as least partially also for supplying the measuring device with electrical energy; and/or each of the two currents serves, at least at times and/or at least in part, also for supply of the measuring device with electrical energy; and/or the measuring device covers its instantaneous energy requirement at least partially by means of the first current; and/or the measuring device covers its instantaneous energy requirement at least in part by means of the first current and at least in part by means of the second current; and/or the measuring device covers its instantaneous energy requirement completely by means of the first and second currents; and/or voltage limiters are placed in said first line-pair and/or said second line-pair for limiting an electrical overvoltage possibly applied to the input of the measuring device electronics to an allowable, maximum value; and/or electrical current limiters are placed in said first line-pair and/or in said second line-pair for limiting a short circuit current possibly flowing in a line-pair to an allowable, maximum value; and/or said first line-pair is galvanically and/or spatially separated from said second line-pair, at least within the measuring device electronics; and/or said electronics data processing system provides at least one supply voltage, which drives at least the current flowing through said first line-pair; and/or the measuring device includes at least one measuring transducer, said measuring transducer reacting to at least one measured variable to be registered, and said measuring transducer delivering to the measuring device electronics at least one measurement signal corresponding at least with the measured variable; and/or the measuring device further includes an electronics housing, which houses the measuring device electronics; and/or the measuring device and said electronics data processing system are further connected with one another by means of at least a third line-pair, through which a third electrical current flows, at least at times, during operation; and/or said electronics data processing system further includes at least one evaluating circuit communicating with at least one of said line-pairs for registering measured values transmitted from the measuring device; and/or said electronics data processing system further includes at least a first measuring resistor, through which the first current flows, at least at times; and/or said electronics data processing system further includes a first evaluating circuit portion communicating with said first line-pair for registering measured values transmitted via said first line-pair, and a second evaluating circuit portion communicating with said second line-pair for registering measured values transmitted via said second line-pair; and/or said electronics data processing system is spatially distributed and/or spatially remote from the measuring device;

at least the first electrical current serves completely also for supplying the measuring device with electrical energy; and/or at least one voltage limiter is placed in said first line-pair and/or said second line-pair at an input of the measuring electronics for limiting an electrical overvoltage possibly applied to the input of the measuring device; and/or at least on current limiter is placed at an input of the measuring device electronics; and/or said first line-pair is partitioned and/or encapsulated apart from said second line-pair, at least within the measuring device electronics; and/or said electronics data processing system provides at least a first supply voltage, which drives, at least at times, said first current flowing, at least at times, through said first line-pair; and said electronics data processing system provides at least a second supply voltage, which drives, at least at times, the second current flowing through said second line-pair.

* * * * *